July 29, 1958 F. FESSLER 2,845,262
APPARATUS FOR CONDITIONING MATERIALS
Filed June 26, 1957
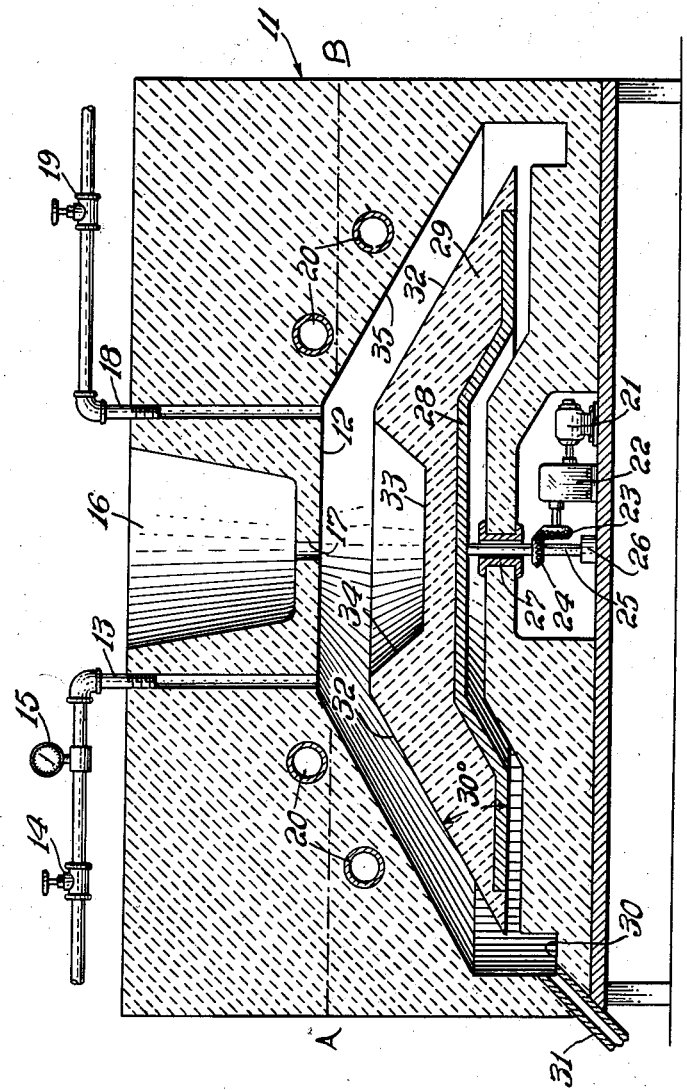
INVENTOR.
Frank Fessler
BY
Norman N. Popper
ATTORNEY

United States Patent Office 2,845,262
Patented July 29, 1958

2,845,262

APPARATUS FOR CONDITIONING MATERIALS

Frank Fessler, Newark, N. J., assignor of ten percent to James J. Gustat, East Orange, ten percent to Edwin W. Phillips, Millburn, ten percent to Patrick F. McDevitt, Jersey City, ten percent to Charles W. Hutchinson, Chatham, five percent to Arthur J. Blake, Jersey City, and fifteen percent to Raymond J. Lamb, Ridgewood, N. J.

Application June 26, 1957, Serial No. 668,183

8 Claims. (Cl. 266—34)

This application is a continuation-in-part of my co-pending patent application Serial No. 584,562, filed May 14, 1956, now Patent No. 2,811,437 and of my co-pending patent application Serial No. 198,801, filed December 2, 1950.

The present invention relates generally to an apparatus for conditioning materials and specifically to an apparatus for removing gases from molten metals and other materials, for the controlled introduction of gases into molten metals and other materials, for homogenizing combinations of molten metals and other materials, and for the introduction of inert and active gaseous matter into molten metals and other materials.

It is well known that in solidification of molten metals and alloys, gases frequently are entrapped therein causing voids, porosity and other imperfections. On the other hand, controlled introduction of gases into molten metals and alloys is used for protecting against oxidation and reducing of oxides, for controlled oxidation of carbon and other components, for controlled entrapment of gases in the solidified metals in order to eliminate or reduce the pipe of ingots. An example of the latter is effervescent steel.

It is also true that non-eutectic alloys tend to segregated during solidification and that it is extremely difficult to produce castings of homogeneous composition when molten metals are combined which are not miscible or only miscible to a very limited degree.

Various methods and apparatus have been devised to degas molten metals, to introduce gases into molten metals, and to cause poorly miscible metals to form homogeneous solid alloys. In spite of these efforts, neither degassing of metals by such apparatus and methods, nor controlled introduction of gases into molten metals, nor homogeneous solidification of incompatible metals have been entirely successful.

My invention is made in recognition of the desirability of conditioning molten metals and mixtures of molten metals to endow them with a homogeneous character after solidification when the metals in combination are incompatible, or to introduce gases into molten metals under strictly controlled conditions or to completely remove gases from molten metals. All of these objects may be achieved by the apparatus herein described and the methods herein specified which may be most expeditiously practiced in the apparatus aforementioned.

One object of my invention is to provide an apparatus for controlled introduction of gases into molten metals, particularly the controlled introduction of hydrogen into molten steel for the production of effervescent steel ingots.

Yet another object of my invention is to provide an apparatus for the removal of hydrogen and other gases from molten metals.

A still further object of my invention is to provide an apparatus for blending thoroughly poorly miscible or non-miscible components of alloys to obtain improved uniformity of castings made from such combinations of metals or other materials.

To these ends, the present invention consists in providing apparatus for conditioning materials and molten metals, comprising a rotatable vessel, a chamber enclosing the vessel, a means for rotating the vessel, an outer wall of the vessel diverging outwardly and downwardly from the top of the vessel, an inner wall of the chamber disposed in opposition to the outer wall of the vessel.

In order that the invention may be more clearly understood and readily carried into effect, the same will now be described more fully with reference to the accompanying drawing, in which the figure is a sectional elevational view of an apparatus for conditioning materials and molten metals in accordance with the following specification.

My apparatus for conditioning materials and metals in the molten state comprises a revolving vessel open at the top and made of, or lined with, refractory material suitably resistant to destruction by the molten metals to be treated. This revolving vessel has an outer wall diverging outwardly and downwardly from the top of the vessel. The revolving vessel is located in a chamber from which gases may be evacuated or into which chosen gases may be introduced. The chamber has a top stationary receptacle for receiving molten metal and for discharging it into the revolving vessel. Provision is made outside the chamber for causing the rotation of the revolving vessel. The walls of the chamber on the inside define a cavity for the revolving vessel and are disposed at angles either substantially corresponding with the outside wall of the vessel or so chosen that they cooperate with the functioning of the outside wall of the revolving vessel.

Like the revolving vessel, the wall of the chamber is formed of or lined with refractory material suitably resistant to molten metals and erosive action of molten metals forcibly discharged against the wall of the chamber. Fused aluminum oxide, for instance, can be used for this purpose at least on those spots where high resistance to heat and erosive action is required. The inside wall of the revolving vessel diverges upwardly and outwardly from the bottom of the vessel. The spinning of the vessel, due to centrifugal force, discharges the molten metal over the top of the vessel so that it, depending upon the rate of rotation, flows over the lip and down the outside wall of the vessel or is thrown into more or less violent contact with the wall of the chamber.

When the rate of rotation is low and the molten metal flows down the outer wall of the vessel, the film of liquid metal on the outside walls of the vessel is very thin, i. e., the hydrostatic column of liquid metal is extremely small.

When the rate of rotation is high, the molten metal in traversing the gap between the revolving vessel and the inside wall of the chamber, assumes various haphazard forms, such as globules, ribbons and the like, but upon violent contact with the wall of the chamber, such forms are drastically reduced in size and these small particles of liquid metal rebound to the outside wall of the revolving vessel and either rebound from the walls of the revolving vessel or are again spun off into repeated violent contacts with the inside wall of the chamber. Thereby, the liquid metal particles become gradually more and more reduced in size and reach a state of substantial atomization until they ultimately fall into an annular pit at the base of the chamber. The higher the rate of rotation, the more effectually is the reduction in size of the liquid metal particles. The molten metal accumulated in the pit leaves the latter through one or more outlets and flows into molds. The molten metal is introduced into the chamber at a sufficiently elevated temperature so that it does not freeze before it is discharged from the pit into the molds. In order to insure the metal remaining in the molten state, the apparatus must be preheated before use. The chamber may be heated during processing in various ways to maintain the chamber at sufficiently elevated temperature to prevent freezing of the molten metal. The chamber is evacuated either before introduction of the molten metal—in which case the metal inlet and outlet have to be plugged—or after introduction of the molten metal when he inlet is blocked by inpouring molten metal and the outlet from the pit is blocked by outpouring molten metal. Under like circumstances, chosen gas may be introduced into the chamber under selected suitable pressure.

Referring now to the drawing, it will be seen that the present invention uses the principle of reduced hydrostatic pressure for purposes of removing gases from molten metals and also for introducing gases into molten metals. Simultaneously homogenization of immiscible or poorly miscible metals is accomplished by reducing the particle size of the components to be blended. It is well known that in all cases of simple solutions, the absorption of gases in metals is proportional to the square root of the gas pressure. The reduction of the hydrostatic pressure of the liquid metal column, under conditions of high vacuum, therefore, greatly expedites the removal of gas from molten metal. These favorable conditions are further improved in the portion of the metal which is atomized by repeated rebounding. Under these conditions, optimum equilibrium is reached in a very short time while the liquid metal passes through the apparatus. On the other hand, when inert gases such as helium are introduced while the liquid metal passes through the apparatus, the partial vapor pressure of gases released from the liquid metal such as hydrogen, carbon monoxide, etc., is greatly reduced.

When introduction of reducing gases such as hydrogen is the object (for instance, for the purpose of producing effervescent steel ingots of uniform good quality) the apparatus permits the introduction into each weight or volume unit of the liquid steel, exactly the amount of hydrogen which is required to reduce or eliminate piping in the ingot, but the amount of hydrogen introduced can be controlled so closely that porosity and similar defects in the rolled steel are avoided.

In regard to homogenization of poorly miscible components, it will be readily understood that extremely small particles of molten metals resulting from repeated rebounding require more time to coalesce than larger particles so that rapid passing through the pit and discharge into cooled molds accomplishes homogeneous and uniform castings.

An apparatus 11 of suitable refractory material or lined with a suitable refractory layer resistant to deterioration through heat and erosive contact with molten metal is provided. A chamber or cavity 12 is provided in the apparatus 11. A gas conduit 13 extends through the wall of the apparatus into the cavity 12. A valve 14 will control the flow of gas into the cavity 12 with suitable pressure indicating means 15. The top of the apparatus 11 is provided with a receptacle or reservoir 16 for the reception of molten metal prior to its entry into the cavity 12 and this reservoir 16 has an inlet 17 through which the molten metal is introduced into the chamber 12. A further conduit 18 passes through the walls of the apparatus 11 to the cavity 12 and through this the gases of the cavity 12 may be evacuated. A valve 19 controls this conduit 18. This conduit 18 is connected to a vacuum pump.

The walls of the chamber are preferably provided with heating tubes 20, whereby the cavity 12 may be maintained at an elevated temperature so that molten metal coming in contact with the walls will not be so reduced in temperature as to freeze, either upon contact or later, in the pit hereinafter referred to, before the molten metal can be discharged. Beneath the apparatus 11, or in a suitable compartment therein, an electric motor 21 with suitable speed changing means 22 is connected by a bevel gear 23 to a second bevel gear 24 mounted on the vertical shaft 25. This shaft is supported at its lower end on a bearing 26 and passes through a substantially airtight bushing 27 into the cavity 12. Mounted on the end of the shaft 25 is a platform or support 28 which upholds a vessel 29 of or lined with suitable refractory material to resist the deteriorating action of molten metal.

Disposed at the base of the vessel 29, there is an annular pit 30 to receive all of the molten metal which gravitationally would fall to the bottom of the cavity 12. An outlet 31 conducts the collected molten metal from the pit 30. The outside wall 32 of the vessel 29, diverges outwardly and downwardly from the top of the vessel to the base of the vessel. It is preferred that the base angle formed at the bottom of the vessel by the side wall should be approximately 15 to 30 degrees from the horizontal. This provides a long, gradual slope from the top of the vessel to the bottom from which molten metal may be repeatedly propelled centrifugally into more or less violent contact with the inner wall of the chamber 12. Likewise, metal flowing thinly up the inner wall 34 of the vessel 29 will have a long and relatively large area on the outer wall 32 of the vessel to flow over or rebound from. This enhances the receptivity of the metal to conditioning. The receptivity for conditioning is enhanced to a degree either if the metal only flows thinly over the side wall or if it is violently propelled and atomized by contact with the inner wall of the chamber. But the greatest conditioning results from atomization through violent contact. A depression 33 in the top of the vessel 29 receives the molten metal which enters through the inlet 17. The wall 34 of this depression diverges upwardly and outwardly as it progresses from the bottom of the depression 33 toward the top of the vessel. This depression 33 may be very shallow or quite ample in depth.

The side wall 35 of the chamber is preferably disposed in substantial angular conformity with the side wall 32 of the vessel 29, although certain irregularities in the surfaces of both the side wall 32 of the vessel 29 and the side wall 35 of the cavity 12 are possible and may actually enhance the atomization of the molten metal. The substantial angular conformity (with some deviation) of these walls 32, 35, however, is calculated to induce a back and forth bounding and rebounding of molten metal particles until a high degree of atomization takes place, and ultimately the formation of a molten metal mist.

The operation of my apparatus and the practice of my methods for conditioning metal may proceed upon preheating of the apparatus 11. In the event that the operation desired is the introduction of gas into molten metal such as the production of effervescent steel, molten carbon steel with desired percentages of manganese and silicon is poured into the receptacle 16. The molten metal in the receptacle 16 flows through the inlet 17 after the removal of a plug, and that metal will then fall into the cavity 33 in the vessel 29. The vessel 29 will then be rotating at a high rate of speed and the metal will be flung out of the concavity 33. It will flow thinly up the inside wall 34 of the vessel 29 and out over the lip of the vessel 29. The molten metal will fly into violent contact with the inner wall 35 of the chamber 11 and will violently bound and rebound against that wall and from the side 33 of the vessel 29. I refer to the reversal of, or change in, the direction of movement of the metal or molten metal after contact with either the inside of the chamber and the outside wall of the vessel in turn, whether brought about simply by rebounding or by ricocheting, or by those actions as modified by the action of gravitational or centrifugal force. The metal will ultimately accumulate in the pit 30 due to gravity and will flow out the outlet 31. Suitable gas, hydrogen for example, is introduced through the conduit 13, and the pressure maintained at the desired level. The proper rate of introduction of hydrogen in order to produce the optimum result in the ingot may be determined by analysis of spoon samples and samples taken from the finished ingot, as well as other determinations to discover the best conditions. Once these figures are known for a steel of certain analysis, then the identical result may be consistently reproduced; e. g., the amount of hydrogen (or any other chosen gas) introduced into the metal may be quantitatively controlled with great precision by adjusting the rate of introduction of gas into the chamber to the amount of metal processed in the chamber per time unit. Metal pouring from the cavity 12 through the outlet 31, will freeze into ingots having exactly the amount of hydrogen required to prevent piping, but avoiding porosity or other imperfections of rolled steel.

On the other hand, if instead of introducing gases into the cavity 12 through the conduit 13, the gases of the cavity 12 are exhausted through the conduit 18, the metal will readily give up its gaseous content, and upon being discharged from the outlet 31 will form castings of degassed metal.

Metal may likewise be conditioned to a lesser degree without atomizing it by regulating the speed of the vessel 29 so as to just centrifugally spin the metal up the walls 34 and flow the metal down the wall 32.

The outside wall of the revolving vessel can have the shape of steps. If such a design is used, the shape and inclination of the inside wall of the chamber should be so chosen in corresponding conformity that maximum rebounding action is accomplished.

The equatorial line A—B in the figure indicates the point at which the apparatus may be divided into two parts for convenience in disassembly, cleaning, etc.

Assuming the outside top diameter of the rotating vessel is 2′ 3″ and the outside bottom diameter 7′. The circumference at the top is 7.0886′ and the circumference at the bottom outside is 21.9911′. When the vessel rotates at 300 R. P. M., the circumferential velocity at the top is 35.34′ per second, the circumferential velocity at the bottom outside is 109.95′ per second. The centrifugal force acting upon the molten metal increases from the top to the bottom in proportion to the increased circumferential velocity. With each rebounding, therefore, the atomizing action increases, thereby reducing the size of the liquid metal particles more and more. This is not only important in order to obtain the objectives of degassing, of introducing gases and of homogenization, but also for enabling the material of the apparatus to resist impact deterioration since the mass of the particles decreases as their velocity increases.

At the top, the metal is thrown in ribbons or large globules against the wall of the chamber. Even the best refractory material can only withstand a certain impact. Therefore, the gradual decrease in particle size in passing from the top to the bottom makes it possible to build the apparatus.

Reference has been had to the conditioning of molten metal by introducing gases or removing gases. Another conditioning is simultaneously effected if a combination of molten metals is deposited in the receptacle 16. A plurality of receptacles 16 and inlets 17 may then be provided. Ferromanganese and steel may then be simultaneously introduced into the evacuated chamber to make manganese steel. Certain metals are poorly miscible with each other and rather than solidifying in a homogeneous manner, they tend to separate from each other when in the molten state. The introduction of incompatible molten metals into the receptacle 16 under the procedures hereinbefore referred to will result in the discharge from the outlet 31 of a highly homogeneous mixture of the molten metals and if castings are frozen rather promptly, the incompatibility of the molten metals will not effectuate any substantial segregation. The mixture of metals may be degassed or have gas simultaneously introduced.

Examples of commercial alloys of poorly miscible metals are the copper lead bearing alloys SAE 48 (67–74% Cu and 25–32% Pb) and SAE 480 (60–70% Cu and 30–40% Pb). Such bearings are frequently made by applying of copper lead powder to steel strip which is passed through furnaces where the mixtures are sintered and bonded. However, when bushings of these alloys are made by casting, lead segregation occurs.

Copper lead bearings and bushings made by sintering of powder are supposed to have a certain porosity which improves the retention of lubricants. When my apparatus is used with the pit practically empty while inert or reducing gases are introduced, a mixture of molten metal particles of very small particle size and gas leaves through the outlet. When such a mixture comes directly from the outlet into the molds, castings of controlled porosity are produced because the pores depend on the ratio of metal drop to gas and can be varied as desired.

It is also possible to combine non-metallic components such as graphite (for lubricating purposes) with the molten metal in desired proportions.

Another example is the combination aluminum-cadmium. The addition of Cd to Al and aluminum alloys has been recommended as aluminum solder, aluminum base bearing alloys, free cutting aluminum alloys and aluminum alloys with increased resistance to salt water spray. Due to the poor miscibility of aluminum and cadmium, these recommendations have been used to a very limited degree. My apparatus overcomes these difficulties.

In the field of ferrous metals, similar combinations appear feasible such as the addition of bismuth to stainless alloys to obtain improved corrosion resistance. When solid bismuth is added to molten stainless alloys in the receptacle 16, it will melt immediately but before it can evaporate, the liquid alloy has passed the apparatus and left from the pit 30 through the outlet 31 into a mold.

In introducing gas into molten metal, as may readily be anticipated, the higher the gas pressure the more rapidly will the atomized metal absorb the gas. Likewise, since the gas will be absorbed by small discreet molten metal particles, when these small discreet metal particles which have each absorbed a quantity of gas are collected into a large mass, the gas will be homogeneously distributed throughout the entire large metal mass. Thus, castings formed are highly homogeneous in character insofar as gaseous inclusions are concerned.

In degassing metal, a high degree of degassed metal is achieved through the use of a high vacuum of the order of .1 to .001 atmosphere.

While I have referred to an angular inclination of the outer wall 32 of the vessel 29 at 15 to 30 degrees, it is not to be understood that this angular inclination is critical for the angle could probably be reduced to less than 15 degrees or increased beyond 30 degrees. However, the inclination of the outer wall 32 to provide a substantially long slope for the rebounding of metal from the wall 35 is one of the principal features of my invention. Heretofore the centrifuging of molten metal has been utilized for the purposes of degassing, the atomization of the molten metal has been incomplete and so transitory because the metal globules produced have almost instantaneously fallen into a pit and coalesced into larger molten masses before any substantial amount of gas was discharged. In my conditioning procedure, the rapid, direct depositing of the metal into the pit is avoided and insofar as it can be calculated, it is believed that at appropriately high rates of speed the atomized metal, as well as the larger globules and ribbons of metal, will be thrown against the inside wall of the chamber to rebound against the outside wall of the vessel repeatedly so that with each rebound, increasingly finer atomization is achieved ultimately resulting in the formation of a metal mist. The frequency of rebound is a function of the speed of revolution of the vessel 29 and the angular inclination and length of the walls 32, 35.

In the foregoing, metal has been used as a prime example of a material for conditioning. It is obvious that the characteristics of other materials are such that even though they may not be technically metals, they are endowed with the same qualities and characteristics, and may likewise be conditioned in my apparatus. Thus, the apparatus may be utilized in a wide variety of conditioning operations with a wide variety of materials:

(1) The rebounded material may be a solid, a liquid, or a gas, or mixtures of each, any or all.

(2) The atmosphere of the chamber may be evacuated, or it may be a gas or a mixture of gases.

(3) The conditioning may be merely physical, chemical, or nuclear.

(4) The rebounded material may be conditioned while it is in a phase (gas, liquid or solid) which is different from its phase at S. T. P.

Attention is directed to the fact that the receptacle 16 is merely a matter of convenience which may be used for accumulating material for conditioning or the receptacle may be dispensed with and the material passed directly into the chamber 12.

It is further noted that the chamber 12 is referred to as having a rotatable vessel 29 disposed therein. While the presence of the depression 33 in the top of the vessel 29 to receive metal prior to conditioning is desirable, in order to insure the discharge of the material from the vessel at a high velocity, it will be apparent that material deposited on a rotating member with only a slight depression 33 or indeed, a member having a pointed apex will tend to centrifugally discharge from its surface, any material deposited upon it. Such discharge, however, is enhanced as to its velocity by utilizing a depression 33.

Definitions

"Rebounding" refers to the contact of metal or material against either the inside-wall of the chamber or the outside wall of the vessel and the spring-back therefrom, whether by reason of the resilence of the material, or the metal on the wall; part of the spring-back from the outside of the vessel and the inside of the chamber may be governed by gravity; likewise, spring-back from the outside wall of the vessel may be the result of the metal, other material, or the wall being resilient or it may be the result of spin-off from the revolving vessel or a combination of several of these factors. "Rebounding" includes all spring-back, regardless of its cause.

"Conditioning" is intended to refer to putting the metal or other material into a desired condition; this comprises establishing a homogeneous quality in a mass of metal or other material, introducing gas into the metal or other material, degassing the metal or other material, investing the metal or other material with an inert gaseous atmosphere, enveloping or commingling the metal or other material with an active gaseous atmosphere. The envelopment or commingling of the metal or other material with an active gaseous atmosphere may cause physical or chemical changes. Conditioning comprises these results.

I have described my apparatus for conditioning metals and other materials, and it is to be understood that the apparatus may be used for conditioning other materials, either metallic or non-metallic in character, with or without gaseous inclusions or of a highly homogeneous character. It should be further noted that various modifications may be made in the nature of the gaseous material which is introduced into the metal and changes in the precise form of the apparatus may likewise be made, all within the scope of the claims without departing from the spirit of the invention. The precise method of introducing gas into the chamber is no part of my invention, since the gases may be introduced therein by introducing gas generating liquids or solids into the chamber. It will be understood from the foregoing description that the term "conditioning" as used herein includes establishing a homogeneous quality in the material treated, or the introduction of gas to or the removal of gas from such material, regardless of whether such treatment is for the purpose of producing physical or chemical changes in the material, or both.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A conditioning device comprising a rotatable member, a chamber enclosing the member, a means for rotating the member, portions of the rotatable member's outer surface throughout its length extending in a generally outward and downward direction in general opposition to material rebounded from the inner surface of the chamber, portions of the inner surface of the chamber throughout its length similarly extending in a generally outward and downward direction in general opposition to material rebounded and centrifugally discharged from the member, and said surfaces arranged in predetermined spaced relation to each other.

2. A conditioning device comprising a rotatable vessel, a chamber enclosing the vessel, a means for rotating the vessel, portions of the vessel's outer surface throughout its length extending in a generally outward and downward direction in general opposition to material rebounded from the inner surface of the chamber, portions of the inner surface of the chamber throughout its length similarly extending in a generally outward and downward direction in general opposition to material rebounded and centrifugally discharged from the vessel, and said surfaces arranged in predetermined spaced relation to each other.

3. A conditioning device comprising a rotatable member, a chamber enclosing the member, a means for rotating the member, portions of the rotatable member's outer surface throughout its length extending in a generally outward and downward direction in general opposition to material rebounded from the inner surface of the chamber, portions of the inner surface of the chamber throughout its length similarly extending in a generally outward and downward direction in general opposition to material rebounded and centrifugally discharged from the member, said surfaces arranged in predetermined spaced relation to each other, and means for introducing material into the chamber.

4. A conditioning device comprising a rotatable member, a chamber enclosing the member, a means for rotating the member, portions of the rotatable member's outer surface throughout its length extending in a generally outward and downward direction in general opposition to material rebounded from the inner surface of the chamber, portions of the inner surface of the chamber throughout its length similarly extending in a generally outward and downward direction in general opposition to material rebounded and centrifugally discharged from the member, means for introducing a controlled volume of gas into the chamber, and said surfaces arranged in predetermined spaced relation to each other.

5. A conditioning device comprising a rotatable member, a chamber enclosing the member, a means for rotating the member, portions of the rotatable member's outer surface throughout its length extending in a generally outward and downward direction in general opposition to material rebounded from the inner surface of the chamber, portions of the inner surface of the chamber throughout its length similarly extending in a generally outward and downward direction in general opposition to material rebounded and centrifugally discharged from the member, said surfaces arranged in predetermined spaced relation to each other, and means for evacuating gas from the chamber and gas from the material in the chamber.

6. A conditioning device comprising a rotatable member, a chamber enclosing the member, a means for rotating the member, portions of the rotatable member's outer surface throughout its length extending in a generally outward and downward direction in general opposition to material rebounded from the inner surface of the chamber, portions of the inner surface of the chamber throughout its length similarly extending in a generally outward and downward direction in general opposition to material rebounded and centrifugally discharged from the member, said surfaces arranged in predetermined spaced relation to each other, and means for controlling the presence of gas in the chamber.

7. A conditioning device comprising a rotatable member, a chamber enclosing the member, a means for rotating the member, portions of the rotatable member's outer surface throughout its length extending in a generally outward and downward direction in general opposition to material rebounded from the inner surface of the chamber, portions of the inner surface of the chamber throughout its length similarly extending in a generally outward and downward direction in general opposition to material rebounded and centrifugally discharged from the member, the said surfaces of the member and the chamber disposed at an angle of approximately 30° from the horizontal, and said surfaces arranged in predetermined spaced relation to each other.

8. A device for conditioning molten metal comprising a rotatable member, a chamber enclosing the member, a means for rotating the member, portions of the rotatable member's outer surface throughout its length extending in a generally outward and downward direction in general opposition to material rebounded from the inner surface of the chamber, portions of the inner surface of the chamber throughout its length similarly extending in a generally outward and downward direction in general opposition to material rebounded and centrifugally discharged from the member, and said surfaces arranged in predetermined spaced relation to each other.

References Cited in the file of this patent
UNITED STATES PATENTS

| | | |
|---|---|---|
| 391,223 | Pielsticker et al. | Jan. 1, 1884 |
| 2,355,885 | Merle | Aug. 15, 1944 |